(12) United States Patent
Stiglmair et al.

(10) Patent No.: US 10,731,534 B2
(45) Date of Patent: Aug. 4, 2020

(54) CATALYST BODY, ELECTRICALLY HEATED CATALYST, MOTOR VEHICLE WITH CATALYST AND METHOD FOR PRODUCING A CATALYST

(71) Applicant: Faurecia Emissions Control Technologies, Germany GmbH, Augsburg (DE)

(72) Inventors: Manfred Stiglmair, Augsburg (DE); Axel Boehmer, Augsburg (DE); Ting Feng, Augsburg (DE); Matthias Hildebrand, Augsburg (DE); Jean-Francois Perret, Augsburg (DE)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 0 days.

(21) Appl. No.: 16/667,125

(22) Filed: Oct. 29, 2019

(65) Prior Publication Data
US 2020/0131965 A1    Apr. 30, 2020

(30) Foreign Application Priority Data
Oct. 30, 2018    (DE) .......... 10 2018 127 074

(51) Int. Cl.
 *F01N 3/20*     (2006.01)
 *F01N 3/28*     (2006.01)
(52) U.S. Cl.
 CPC ............. *F01N 3/2026* (2013.01); *F01N 3/28* (2013.01); *F01N 2450/16* (2013.01); *F01N 2450/24* (2013.01); *F01N 2510/00* (2013.01)

(58) Field of Classification Search
 CPC ...... F01N 3/28; F01N 3/2026; F01N 2450/16; F01N 2450/24; F01N 2510/00
 USPC ........................................ 422/174
 See application file for complete search history.

(56) References Cited

U.S. PATENT DOCUMENTS

| | | | | |
|---|---|---|---|---|
| 5,177,961 A * | 1/1993 | Whittenberger | ...... | F01N 3/2026 422/174 |
| 5,232,671 A * | 8/1993 | Brunson | .............. | B01J 35/0033 422/174 |
| 5,238,650 A * | 8/1993 | Sheller | .................. | F01N 3/2026 219/205 |
| 5,245,825 A * | 9/1993 | Ohhashi | ............. | B01D 53/9454 219/552 |
| 5,582,805 A * | 12/1996 | Yoshizaki | ............. | F01N 3/2026 422/174 |
| 8,540,940 B2 * | 9/2013 | Murata | .................. | B01D 53/88 422/174 |

(Continued)

FOREIGN PATENT DOCUMENTS

| | | |
|---|---|---|
| EP | 2674215 A1 | 12/2013 |
| JP | H05269387 A | 10/1993 |

*Primary Examiner* — Tom P Duong
(74) *Attorney, Agent, or Firm* — Carlson, Gaskey & Olds, P.C.

(57) ABSTRACT

An electrically heated catalyst has a catalyst body and a housing at least circumferentially surrounding the catalyst body. An electrical contacting assembly is arranged on a shell surface of the catalyst body, the electrical contacting assembly comprising a surface electrode arranged directly on the catalyst body and a contacting element connected to the surface electrode. The contacting element is rigid and has a screw thread.

12 Claims, 2 Drawing Sheets

(56) References Cited

U.S. PATENT DOCUMENTS

| | | | | |
|---|---|---|---|---|
| 8,765,068 B2 * | 7/2014 | Ishihara | ................. | B01D 53/00 |
| | | | | 422/174 |
| 8,938,952 B2 * | 1/2015 | Kumagai | .............. | F01N 3/2013 |
| | | | | 60/286 |
| 9,049,750 B2 * | 6/2015 | Ishihara | ................... | H05B 3/06 |
| 9,121,322 B2 * | 9/2015 | Watanabe | ............. | F01N 3/2026 |
| 9,845,714 B2 * | 12/2017 | Mori | ..................... | F01N 3/2013 |
| 10,352,213 B2 * | 7/2019 | Korenaga | ............... | F01N 3/101 |

* cited by examiner

CATALYST BODY, ELECTRICALLY HEATED CATALYST, MOTOR VEHICLE WITH CATALYST AND METHOD FOR PRODUCING A CATALYST

CROSS-REFERENCE TO RELATED APPLICATIONS

This application is a U.S. non-provisional application claiming the benefit of German Application No. 10 2018 127 074.7, filed on Oct. 30, 2018, which is incorporated herein by its entirety.

TECHNICAL FIELD

The invention relates to a catalyst body, an electrically heated catalyst, a motor vehicle with an electrically heated catalyst, and a method for producing a catalyst.

BACKGROUND OF THE INVENTION

Catalysts are used in motor vehicles with combustion engines to clean pollutants, above all nitrogen oxides, out of the exhaust gas. For this purpose, the exhaust gas is passed through a catalyst body, in which the pollutants are deposited. In order to achieve a sufficient gas-cleaning action, the catalyst body must have a certain minimum temperature. As this minimum temperature is not immediately ready, for example, after a cold start, it is usual to heat the catalysts electrically. In this way, the cold-start behavior of a motor vehicle can be shortened and pollutants in the exhaust gas can thereby be reliably eliminated.

In this case, for heating purposes, electrodes are provided on a shell surface of a catalyst body. As these electrodes stick out laterally from the catalyst, however, they make it more difficult to install a housing around the catalyst body.

SUMMARY

An object is thus to contact a catalyst body such that the installation of the catalyst body in a housing is not impeded.

This is achieved by a catalyst body with the features of claim 1, an electrically heated catalyst with the features of claim 7, a motor vehicle according to claim 12 and a method with the features of claims 13 and 14.

The core of the invention is that at least one electrical contacting assembly is arranged on a shell surface of the catalyst body, with the contacting assembly comprising a surface electrode arranged directly on the catalyst body and a contacting element connected to the surface electrode, wherein the contacting element is rigid and has a screw thread. The contacting assembly is in particular not arranged on the end faces of the catalyst body.

Via the screw thread in the contacting element, a conductor can be connected to the contacting element, in particular can be screwed into the screw thread, in order to achieve a stable electrical connection to the contacting element and thus to energize the surface electrode.

As the contacting element is rigid, the contacting element is prevented from being bent during the installation of the catalyst body in the housing, which makes a reliable contacting possible.

The screw thread of the contacting element is, for example, a female thread. Thereby, the catalyst body may have a compact design. Moreover, a female thread may be accessible more easily than a male thread.

A screw-in-direction of the conductor to the screw thread of the contacting element may be a direction transverse, in particular a direction perpendicular to a longitudinal axis of the catalyst body.

The surface electrode comprises, for example, an electrode paste and/or a metal plate which is adhered to the catalyst body. The metal plate can be a sheet which lies flat against the catalyst body or contacts the catalyst body in places via a plurality of contact elements which are bent out of the sheet. The contact elements are, for example, small metal bars which stick out from the surface electrode in the direction towards the catalyst body. In each case, the catalyst body is contacted over a large area by the surface electrode and can be heated in a suitable time.

For example, both the catalyst body and the housing are cylindrical. In the past, this design became established. However, other designs are also conceivable.

According to an embodiment, the contacting element is arranged completely inside the housing. In this way, the contacting element is prevented from colliding with the housing, in particular during the installation. For example, the catalyst body can be pushed axially into the housing, as is usual in the case of jamming, without the contacting element colliding with the housing.

For example, the contacting element is arranged directly on the surface electrode, in particular on the outer side of the catalyst body. The catalyst can thereby be particularly compact.

The catalyst body can additionally have a depression and the contacting element can be arranged in the depression in such a way that the contacting element does not protrude beyond an outer surface of the catalyst body. The catalyst can thereby be formed even more compact than with a contacting element on the outer surface. In the process, the housing can surround the catalyst body particularly tightly. The size of the contacting element in this case need not be taken into consideration when the housing is designed.

The contacting element is preferably adhered to the surface electrode, in particular by an electrically conductive adhesive. A fatigue-resistant connection between the contacting element and the surface electrode is thereby easily achieved.

According to a further embodiment, the contacting element is secured to a contact element, in particular a flexible contact element, preferably a flexible tab, wherein the contact element is arranged on the surface electrode. For example, the contact element is likewise adhered or welded to the surface electrode. The contact element can be manufactured from a bendable sheet.

The contact element makes it possible to attach the contacting element to the surface electrode subsequently, thus after the installation of the catalyst body in the housing. The contacting element thus need not be taken into consideration further in the design of the housing.

It is moreover conceivable that the position of the contacting element can be changed because of the flexibility of the contact element. For example, before the installation of the catalyst body in the housing, the contacting element can lie as closely as possible, in particular directly, against the catalyst body. After the installation of the catalyst body in the housing, the contact element can be bent in such a way that the contacting element sticks out from the catalyst body and is thereby more easily accessible. For example, after the installation of the catalyst body in the housing, the contacting element is brought into a position in which the contacting element is arranged partially or completely outside the housing.

The contacting element can be a nut. Nuts can be obtained easily and at low costs.

For the electrical contacting of the catalyst, for example, a screw can be screwed into the contacting element. The catalyst body can thereby be electrically contacted particularly quickly and easily.

At least one opening can be provided in the housing, wherein the opening is arranged over the contacting element in such a way that the contacting element is accessible via the opening. The contacting element is thus also still easily accessible when the catalyst body has already been arranged in the housing. An opening can be easily provided in the housing and is not disruptive during the installation.

According to an embodiment, a cover is arranged over the opening, in particular wherein the cover is held on the catalyst by the screw. The cover protects the contacting assembly from damage and dirt, and seals the housing. Because the opening is held on the catalyst by the screw, no additional securing features are necessary.

The cover can be a plastic cap.

According to an embodiment, the catalyst body is surrounded by an insulating mat. The insulating mat had a damping effect and protects the catalyst body from damage during driving operation. In addition, the catalyst body can be clamped in the housing by the insulating mat.

The object is furthermore achieved according to the invention by a method for producing a catalyst which is formed as described previously. Firstly, a catalyst body, in particular a cylindrical catalyst body, is provided, wherein at least one electrical contacting assembly with a rigid contacting element is arranged on a shell surface of the catalyst body. Then, the catalyst body is wrapped in an insulating mat, wherein the insulating mat comprises openings and wherein the insulating mat is arranged in such a way that the contacting element is not covered by the insulating mat. In a subsequent step, the catalyst body with the insulating mat is encased in a housing, wherein the housing has at least one opening which is aligned in such a way that the contacting element is accessible via the opening. Once the catalyst body is encased, the contacting element is electrically contacted.

With such a method, an electrically heated catalyst body can be produced, which can be easily contacted because the contacting element is easily accessible once the catalyst body is encased.

In an alternative method, the contacting element can be secured to the catalyst body after the encasing. Firstly, a catalyst body, in particular a cylindrical catalyst body, is provided, wherein at least one surface electrode is arranged on a shell surface of the catalyst body. Then, the catalyst body is wrapped in an insulating mat, wherein the insulating mat comprises openings and wherein the insulating mat is arranged in such a way that the surface electrode is partially exposed. Thereafter, the catalyst body with the insulating mat is encased in a housing, wherein the housing has at least one opening, which is aligned in such a way that the opening of the insulating mat and the opening of the housing lie one on top of the other. After the catalyst body is encased, a contact element, in particular a tab, is secured to the surface electrode, wherein a rigid contacting element with a screw thread is arranged on the contact element. In particular, the contact element is welded.

BRIEF DESCRIPTION OF THE DRAWINGS

Further advantages and features of the invention emerge from the following description and the following drawings, to which reference is made. In the drawings, there are shown in.

DETAILED DESCRIPTION

Figure 1:
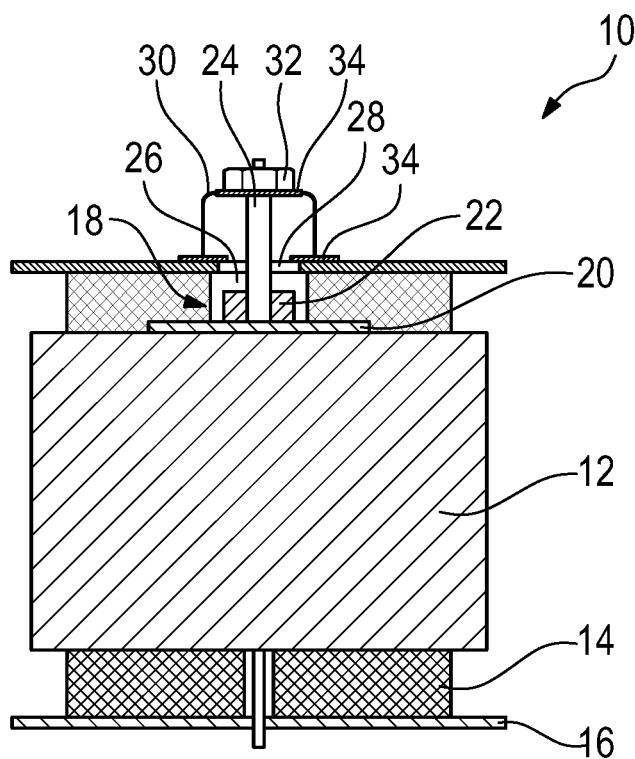
FIG. 1, schematically, a first embodiment of a catalyst according to the invention, FIGS. 2 and 3, schematically, in each case a further embodiment of a catalyst according to the invention, and FIG. 4 a catalyst body with a surface electrode.

FIG. 1 schematically shows an electrically heated catalyst 10 with a catalyst body 12, which is circumferentially surrounded by an insulating mat 14, and a housing 16. The catalyst body 12 is held in the housing 16 via the insulating mat 14.

The catalyst body 12 is, for example, a honeycomb body, in particular made of ceramic or of metal.

A contacting assembly 18, which comprises a surface electrode 20 and a contacting element 22, is provided on a shell surface of the catalyst body 12. The surface electrode 20 is arranged directly on the shell surface of the catalyst body 12.

In the embodiment example shown, the surface electrode 20 is formed by an electrode paste, for example by a silver paste.

The contacting element 22 is rigid and has a screw thread. In particular, the screw thread is a female thread. In the embodiment shown, the contacting element 22 is a nut.

For electrically contacting the electrically heated catalyst 10, a screw 24 is screwed into the screw thread. When screwing the screw 24 into the screw thread, the screw-in-direction is transverse, in particular perpendicular to a longitudinal axis of the catalyst body 12.

The screw 24 is connected to an electrical wire which is not represented in the figures for the sake of simplicity. For example, a cable lug which is threaded over the screw 24 is provided on the wire.

As is seen in FIG. 1, the contacting element 22 is arranged completely inside the housing 16. The housing 16 is spaced apart from the contacting element 22 in the radial direction. The catalyst body 12 can thus be pushed into the housing 16 together with the insulating mat 14, without the contacting element 22 colliding with the housing 16.

For example, the catalyst body 12 is wrapped in the insulating mat 14 and pushed into the housing 16 together with the insulating mat 14. Alternatively or additionally, the housing 16 can then be compressed by a pressing tool in order to improve the seat of the catalyst body 12 in the housing 16.

The thickness of the insulating mat 14 is greater than the height of the contacting element 22 on the catalyst body 12. The insulating mat 14 can thereby be compressed a little during the pressing process in order to make it easier to insert the catalyst body 12 into the housing 16.

In order to guarantee the accessibility of the contacting element 22, the insulating mat 14 comprises at least one opening 26. During the wrapping of the catalyst body 12, the insulating mat 14 is arranged in such a way that the contacting element 22 is not covered by the insulating mat 14.

The housing 16 likewise has at least one corresponding opening 28 which is aligned in such a way that the contacting element 22 is accessible via the opening 28.

Due to the screw thread being a female thread, the size of the opening 28 may be relatively small. In particular, an area surrounding the contacting element 22 does not need to be accessible and may be covered by the housing 16.

According to a further embodiment, which for reasons of simplicity is not illustrated in the figures, the size of the opening 28 may be equal to or smaller than the size of the contacting element 22 in a plan view on the opening 28, which corresponds to a side view on the catalyst body 12. In other words, the housing 16 may overlap with the contacting element 22 in a plan view on the opening 28.

The openings 28 in the housing 16 are closed with a cover 30. The cover 30 is, for example, a plastic cap.

As shown in FIG. 1, the cover 30 is secured with the screw 24 which is at the same time screwed into the contacting element 22 for the contacting. Thus, no additional components are necessary to secure the cover 30.

In order to achieve a gas-tight seal of the openings 28, a seal 34, for example a sealing ring, is arranged in each case between the housing 16 and the cover 30, and between the cover 30 and the screw head 32 of the screw 24.

Figure 2:
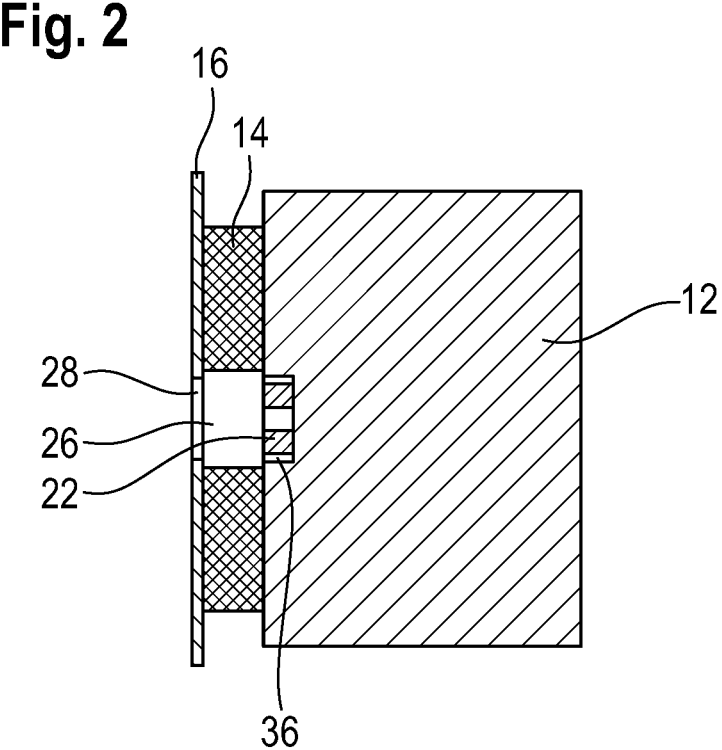

FIG. 2 schematically shows a further embodiment of an electrically heated catalyst 10 according to the invention.

This embodiment differs from the embodiment according to FIG. 1 in that the catalyst body 12 has a depression 36 and the contacting element 22 is arranged in the depression 36 in such a way that the contacting element 22 does not protrude beyond an outer surface of the catalyst body 12. The catalyst 10 is thereby particularly compact. The screw 24 is not represented in FIG. 2 for the sake of simplicity.

Figure 3:
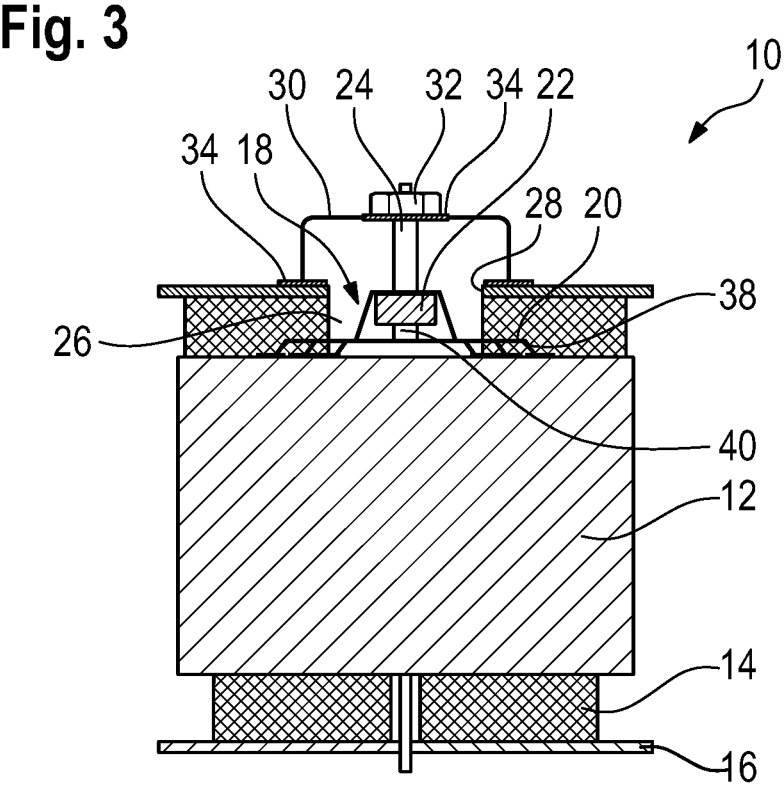

FIG. 3 schematically shows a further embodiment of the electrically heated catalyst 10 according to the invention.

A surface electrode 20 made of a metal plate 38 is illustrated in this representation, instead of the surface electrode 20 made of an electrode paste illustrated in FIG. 1. The metal plate 38 is, for example, adhered to the catalyst body 12.

Figure 4:
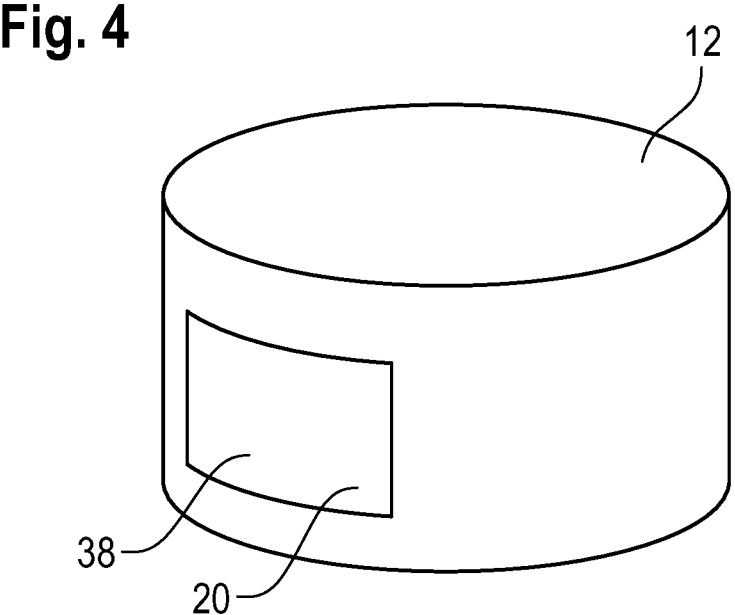

A catalyst body 12 with a corresponding surface electrode 20 is represented in detail in FIG. 4.

The embodiment according to FIG. 3 in addition differs from the embodiments represented in FIGS. 1 and 2 in that the contacting element 22 is not arranged directly on the surface electrode 20, but a contact element 40 is provided, which is arranged on the surface electrode 20 and to which the contacting element 22 is secured. The contact element 40 is preferably flexible, for example made of a bendable sheet.

The contact element 40 can already be secured to the catalyst body 12, in particular to the surface electrode 20, before the catalyst body 12 is installed in the housing 16.

Alternatively, the contact element 40 can be secured to the surface electrode 20 after the catalyst body 12 has been installed in the housing 16. For example, the contact element 40, together with the contacting element 22 secured to the contact element 40, is welded to the surface electrode 20, in particular by laser welding.

All described embodiments of an electrically heated catalyst 10 according to the invention have in common the fact that, despite the presence of a lateral contacting assembly 18 of the catalyst body 12, an easy installation of the catalyst body 12 in the housing is possible.

During the installation, the catalyst body 12 is firstly wrapped in the insulating mat 14, wherein the insulating mat 14 is arranged in such a way that the contacting element 22 is not covered by the insulating mat 14.

Then, the catalyst body 12 is encased, together with the insulating mat 14, in the housing 16, wherein the opening 28 is aligned in such a way that the contacting element 22 is accessible via the opening 28. In this method step, the insulating mat 14 is preferably compressed a little.

Once the catalyst body is encased, the contacting element 22 is electrically contacted.

The contacting element 22 can already be secured to the catalyst body 12 before the encasing or, as described in connection with FIG. 3, can be attached to the catalyst body 12 after the encasing, for example by the contact element 40 welded to the surface electrode 20.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A catalyst body for an electrically heated catalyst:
at least one electrical contacting assembly arranged on a shell surface of the catalyst body, the at least one electrical contacting assembly comprising a surface electrode arranged directly on the catalyst body and a rigid contacting element connected to the surface electrode, wherein the contacting element has a screw thread.

2. The catalyst body according of claim 1 wherein the rigid contacting element is arranged directly on the surface electrode.

3. The catalyst body according of claim 1 wherein the catalyst body has a depression and the rigid contacting element is arranged in the depression in such a way that the rigid contacting element does not protrude beyond an outer surface of the catalyst body.

4. The catalyst body of claim 1 wherein the rigid contacting element is adhered to the surface electrode.

5. The catalyst body of claim 1 wherein the rigid contacting element is secured to a contact element, in particular a flexible contact element, wherein the flexible contact element is arranged on the surface electrode.

6. The catalyst body of claim 1 wherein the rigid contacting element is a nut.

7. An electrically heated catalyst with the catalyst body of claim 1 and a housing at least circumferentially surrounding the catalyst body, and wherein a screw is screwed into the rigid contacting element for electrically contacting the electrically heated catalyst.

8. The electrically heated catalyst of claim 7 wherein the rigid contacting element is arranged completely inside the housing.

9. The electrically heated catalyst of claim 7 wherein at least one opening is provided in the housing, wherein the at least one opening is arranged over the rigid contacting element in such a way that the rigid contacting element is accessible via the at least one opening.

10. The electrically heated catalyst of claim 9 wherein a cover is arranged over the at least one opening, in particular wherein the cover is held on the catalyst body by the screw.

11. The electrically heated catalyst of claim 7 wherein the catalyst body is surrounded by an insulating mat.

12. A motor vehicle with the electrically heated catalyst of claim 7.

* * * * *